United States Patent [19]
Posnansky

[11] 3,892,129
[45] July 1, 1975

[54] TEMPERATURE SENSING DEVICE

[75] Inventor: Mario Posnansky, Horgen, Switzerland

[73] Assignee: Haenni & Cie Aktiengesellschaft, Jegensdorf, Switzerland

[22] Filed: Sept. 17, 1973

[21] Appl. No.: 397,821

[30] Foreign Application Priority Data
Sept. 25, 1972 Switzerland.................. 13954/72
July 17, 1973 Switzerland.................. 10401/73

[52] U.S. Cl................................ 73/371; 73/368.4
[51] Int. Cl............................................. G01k 5/00
[58] Field of Search.......... 73/371, 372, 368.4, 368

[56] References Cited
UNITED STATES PATENTS

| | | |
|---|---|---|
| 1,205,379 | 11/1916 | Nelson.................................. 73/371 |
| 1,443,395 | 1/1923 | Tommasello.......................... 73/371 |
| 2,463,510 | 3/1949 | Brasefield............................. 73/371 |
| 2,614,431 | 10/1952 | Brady.................................... 73/371 |
| 3,555,906 | 1/1971 | Ayres.................................... 73/371 |

Primary Examiner—S. Clement Swisher
Assistant Examiner—Denis E. Corr
Attorney, Agent, or Firm—Werner W. Kleeman

[57] ABSTRACT

A temperature sensing device or instrument with a vessel containing an expansible liquid and a capillary communicating with the vessel. There are provided two bodies which possess different coefficients of expansion in such a way that during a temperature change the volume of the vessel containing the expansible liquid changes. The two bodies can form such vessel, one body being for instance a sleeve in which is arranged a central body constituting the other body.

2 Claims, 3 Drawing Figures

TEMPERATURE SENSING DEVICE

BACKGROUND OF THE INVENTION

The present invention relates to a new and improved construction of temperature sensing device or instrument with a vessel containing an expansible liquid and at which vessel there also merges or is connected a capillary.

Devices of this type primarily serve for sensing or measuring the temperature of solid, liquid and gaseous substances, and particular constructions thereof also should be capable of use for temperature indication and transmission purposes.

The market for temperature sensors or indicators is forever seeking temperature sensing or measuring devices which are more attractive in price, and at the same time there are required improved or in fact even new measurement-, indicating- and transmission-characteristics. The present day availability of such temperature indicators or sensing encompasses a large number of different types of devices. In order to satisfy market requirements there is the possibility of perfecting existing devices, both in terms of their technical aspects as well as also with respect to fabrication thereof. A further possibility resides in discovering new measuring principles, by means of which it is possible to also fulfil additional requirements.

With a new development, apart from the absolute requirement of favorable price, there also must be primarily taken into account the following characteristics of the device:

1. Extremely accurate determination and/or indication and/or transmission of the measurement value;
2. Rapid indication;
3. Possibility of establishing an electrical contact from one or a number of measurement points during ascending or descending temperatures;
4. Possibility of remotely transmitting the measurement values;
5. Possibility of indicating very high or very low temperatures;
6. Extreme longevity of the device;
7. Small sensitivity to impact; and
8. Universal applicability of the instrument or device.

Consequently, there should be possible the following applications:

1. Room temperatures thermometer
2. Fever thermometers
3. Cold — or high temperature thermometers
4. Remote temperature indicators
5. Temperature contact transmitter
6. Seconds thermometer, and so forth.

For a concrete field of application, there is concerned with the provision of an inexpensive temperature sensing instrument or device, which during decreasing temperature, upon reaching a predetermined temperature measurement value within a tolerance of less than about ± 0.2°C, is capable of closing an electrical current circuit. In consideration of this problem, there was initiated the development work from which there was derived the invention of this disclosure.

SUMMARY OF THE INVENTION

Hence, it is a primary object of the present invention to provide an improved construction of temperature sensing device which fulfills the aforementioned requirements.

Another object of the present invention aims at the provision of a new and improved construction of temperature sensing device or instrument which is relatively simple in construction and design, economical to manufacture, and extremely reliable in operation.

Now in order to implement these and still further objects of the invention, which will become more readily apparent as the description proceeds, the temperature sensing device of this development is of the character previously described and is manifested, according to the invention, by the features that there are provided two bodies which possess different coefficients of expansion in such a way that during a temperature change the volume of the vessel containing the expansible liquid changes.

The development work has shown that depending upon the particular characteristics of the instrument or device which are to be taken into account and depending upon the particular use contemplated for the instrument or device, there are possible many different constructional manifestations. It should also be readily apparent that even merely through the selection of the material for both of the bodies and the expansible liquid, as well as also by virtue of the dimensioning of both bodies (and the vessel containing the expansible liquid) it is possible to vary to a wide extent, as desired, the characteristics of the device.

One constructional embodiment of the invention which is advantageous for many different uses is manifested by the features that one of the body members is a sleeve which for the most part forms the wall of the vessel and the other body member is arranged in such sleeve.

For special applications, namely the one mentioned above which was instrumental for the development of the temperature measuring instrument or device of the invention, the conditions can be chosen such that during a temperature drop the height of the column of expansible liquid contained in the capillary decreases.

For several applications, it can be advantageous to form at least one of the body members from plastic, and specifically by virtue of the realization that this material possesses a coefficient of expansion which is greater in contrast to many metals and liquids, and can be inexpensively worked into suitable body shapes by carrying out well known conventional processing techniques.

BRIEF DESCRIPTION OF THE DRAWING

The invention will be better understood and objects other than those set forth above, will become apparent when consideration is given to the following detailed description thereof. Such description makes reference to the annexed drawing wherein.

DETAILED DESCRIPTION OF THE PREFERRED EMBODIMENTS

Figure 1:
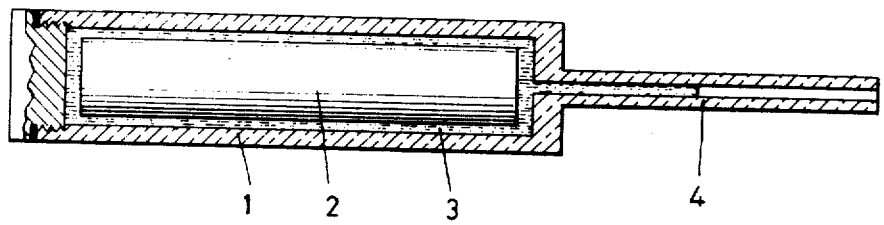
FIG. 1 is a longitudinal sectional view through a first exemplary embodiment of a simple construction of temperature sensing instrument.

The exemplary embodiment of temperature sensing device or instrument depicted by way of example in FIG. 1, comprises a sleeve or sleeve member 1 with a coefficient of expansion $\alpha1$, a central body member 2 with a coefficient of expansion $\alpha2$, an expansible liquid 3 with coefficient of expansion $\alpha3$, a capillary 4 connected to the sleeve 1 and to the vessel containing the liquid 3 formed between the sleeve 1 and the central body 2.

A temperature increase of the medium (that is to say, the solid, liquid or gaseous substance) surrounding the sleeve 1 in each case brings about an unequal expansion of the sleeve 1, the central body 2 and the quantity of liquid 3 which is enclosed in the vessel formed between the sleeve body and central body. By appropriately dimensioning the central body and sleeve and by suitably selecting the substance, there can be attained, for instance, that the height of the liquid column located in the capillary 4 increases during reduction in the temperature or that in contrast to a conventional thermometer decreases.

Through appropriate design of the system, there can be attained a randomly selectable sensitivity. By appropriate selection of the material there can be determined the lowest and maximum temperatures. By appropriately dimensioning the system there also can be produced for certain fields of application a wide, rapid and clearly indicating liquid column.

By suitably designing the geometry of the system it is possible to obtain large and very small time-constants.

For the design and for the calculation of the properties, there is applicable the following equation:

$$\Delta h / \Delta T = (D^2/d^2) \Delta\alpha \cdot l - (v \cdot 4 \cdot \alpha)/(d^2 \cdot \pi)$$

wherein, $\Delta h / \Delta T$ [mm/°C] = Sensitivity, $D$ [mm] = Diameter of the central body 2, $l$ [mm] = Working length of the sleeve 1, $d$ [mm] = Diameter of the capillary tube 4, $\Delta\alpha$ [°C−1] = Difference of the coefficient of thermal expansion of the central body 2 and sleeve 1, $\alpha$ [°C−1] = Coefficient of expansion of the liquid 3, $v$ [mm³] = Volume of the liquid 3 for starting temperature T.

Now hereinafter and with reference to FIG. 2, there will be described an exemplary embodiment of the invention, which during descending temperature upon reaching −1°C (± 0.2°C) is intended to close an electrical current circuit. Foreign switching elements should be avoided and there should not be applied any quiescent current.

Figure 2:
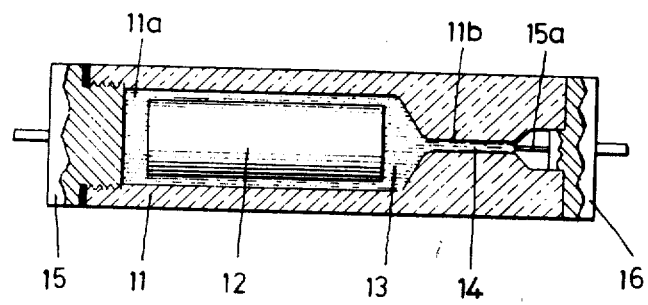
FIG. 2 is a longitudinal sectional view of a second embodiment of the invention, namely a temperature indicator which upon decrease of the temperature to be measured to a predetermined lower boundary value of a temperature range closes an electrical current circuit.

The instrument or device depicted in FIG. 2 is composed of a sleeve 11 in which there are formed the thermometer vessel or pot 11a and the capillary 11b, a central body 12, an expansible liquid 13, which possesses good current conducting properties, for instance mercury, contact element 16 with the contact pin 15a, a contact- and adjusting screw 15 (for calibration).

The system is designed such that when the external temperature drops and thus, for instance, reaches the set value of −1°C, the liquid 14 in the capillary 11b reaches the contact pin 15a.

It is here further mentioned that in both exemplary embodiments the sleeve and/or the central body need not possess a cylindrical shape, rather can be for instance conical. The capillary could possess for instance a circular-shape, spiral-or helical-course. For certain uses the expansible liquid can be a colored liquid. For the indication and closing of a current circuit there are many different possibilities, which are well-known to those skilled in this particular art.

Figure 3:
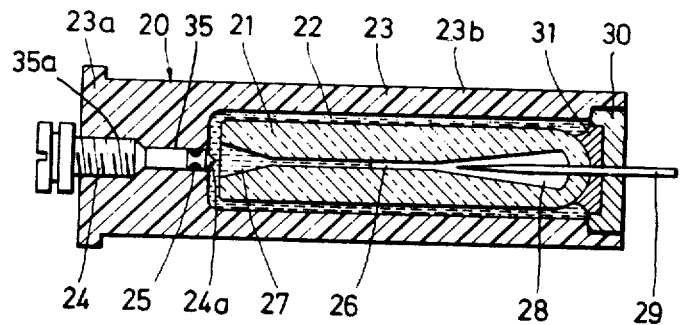
FIG. 3 is a longitudinal sectional view of a third exemplary embodiment of the invention.

The development of the temperature sensing device or instrument depicted in FIG. 3 and constructed as a thermoswitch had the objective of providing such type device which is particularly economically advantageous, renders possible a reduction in the total dimensions and also permits the use of capillary glasses or tubes which are commercially available on the market. These objectives are realized in that:

a. a first contact element is secured in the sleeve and which contact element is always imbued by the liquid; and b. the capillary is formed in the body, which is fixedly seated in the sleeve, and at its end remote from its opening into the vessel extends up to the tip of a contact pin which is fixedly seated in such body.

Now in FIG. 3 there has been designated by reference character 20 the sleeve which forms one of both bodies possessing a different coefficient of expansion, and reference character 22 represents the other of such two bodies which is arranged in the sleeve 20 and together therewith bounds the vessel in which there is contained the expansible liquid 22. The sleeve 20 possesses a primary component or portion 23 which is constructed as an elongate, rotationally symmetrical hollow body, the one end portion or section 23a of which has a central, stepped bore 35 and in the further outer part 35a thereof there is provided a bore portion 35a equipped with internal threading. In this bore there is threadably adjustably inserted a first contact body 24 which is constructed as a screw; its inner part has an annular or ring-shaped groove in which there is inserted a sealing ring 25 and it extends with one tip 24a into the vessel, so that it always is imbued by the expansible liquid 22, which is a current conducting liquid, preferably mercury. The tubular-shaped section 23b forms the jacket wall of the vessel and thus surrounds the body 21. This body 21 preferably consists of glass and has a capillary 26 extending along the common axis of bodies 20 and 21. This capillary 26 opens into the region of the contact body 24 through a conical widened portion 27 into the vessel; at the other end of the capillary there emerges a conical hollow space or chamber 28. A contact pin 29 is fused into the end wall of the body 21 which closes such hollow compartment or chamber 28 and extends with its tip up to the one end of the capillary 26. The contact pin 29 also piercingly extends through a closure disk or plate 30 and a layer 31 of bonding agent, by means of which the body member or body 21 is fixedly connected with the closure disk 30. The latter is fixedly seated in turn by a bonding agent at a step-shaped widened end section of the sleeve primary portion 23.

When the sleeve primary portion or part 23 has a greater coefficient of expansion than the body member 21, such as for instance is the case upon the selection of plastic and glass as the materials for both of these components, then during a reduction in the ambient temperature there is brought about a reduction in the volume of the thermometer vessel; the liquid 22 contained therein is thus increasingly forced into the capillary 26 and at a certain temperature, for which the instrument has been calibrated — the exact calibration can be undertaken by adjusting the contact screw 24 — the liquid will contact the tip of the contact pin 29; it thus forms a current-conducting connection between the contact body 24 and the contact pin 29. In order to prevent premature wear of the contact pin tip caused by possible sparks, the hollow compartment 28 during the molding-in of the contact pin at the hollow compartment end wall can be filled with nitrogen or another suitable gas.

While there is shown and described present preferred embodiments of the invention, it is to be distinctly understood that the invention is not limited thereto, but may be otherwise variously embodied and practiced within the scope of the following claims.

Accordingly, what is claimed is:

1. A temperature sensing device serving as a thermal-switch with a vessel containing an expansible liquid and at which merges a capillary, the improvement comprising two bodies possessing different coefficients of expansion in such a way that during a temperature change the volume of the vessel formed by said bodies and containing the expansible liquid changes, one body being a sleeve which essentially forms a wall of the vessel and the other body being arranged in said sleeve, the expansible liquid comprising a current-conducting liquid, and wherein a first contact element is secured in the sleeve, this contact element always being contacted by the liquid, the capillary is constructed in said other body which is arranged in the sleeve, and said capillary at its end remote from its opening into the vessel extends up to the tip of a contact pin defining a second contact element fixedly seated at said other body, and wherein the sleeve comprises a primary portion constructed as an elongate, rotationally symmetrical hollow body in one end section of which there is centrally inserted the first contact element which is sealed towards the outside and threadably adjustable, said sleeve having a substantially tubular-shaped section which forms the jacket wall of the vessel filled with the expansible liquid, said vessel being bounded at the inside by said other body which possesses said capillary and at the region of the contact pin a widened inner compartment, said other body fixedly supporting said contact pin, said sleeve possessing a closure disk pierced by the contact pin and fixedly connected with the other body, the closure disk being fixedly seated at a step-shaped widened end section of the sleeve primary portion.

2. The temperature measuring device as defined in claim 1, wherein the closure disk is fixedly seated by a binder in the step-shaped widened end portion of the sleeve primary portion.

* * * * *